F. HUTTENLOCHER.
SAFETY DEVICE FOR GAS LAMPS.
APPLICATION FILED AUG. 17, 1911.
1,043,938.
Patented Nov. 12, 1912.
2 SHEETS—SHEET 1.
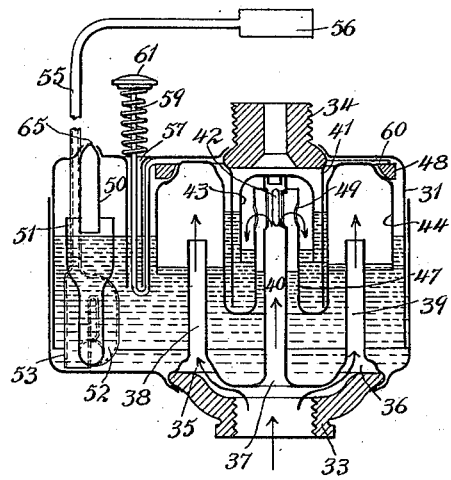
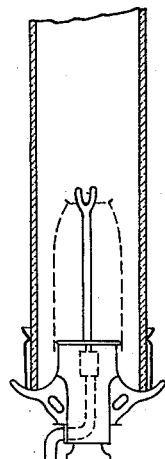
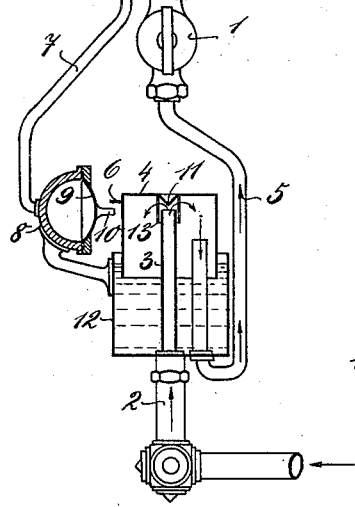
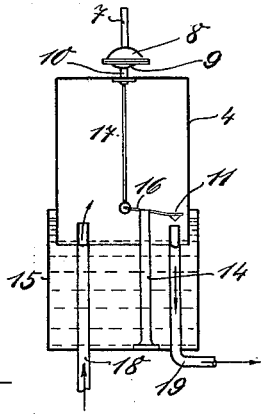
Witnesses.
Inventor.
Friedrich Huttenlocher.
by
Foster, Freeman, Watson & Coit,
Attorney.

F. HUTTENLOCHER.
SAFETY DEVICE FOR GAS LAMPS.
APPLICATION FILED AUG. 17, 1911.
1,043,938.
Patented Nov. 12, 1912.
2 SHEETS—SHEET 2.
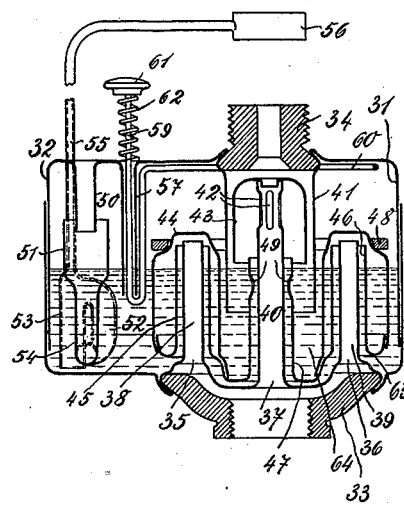
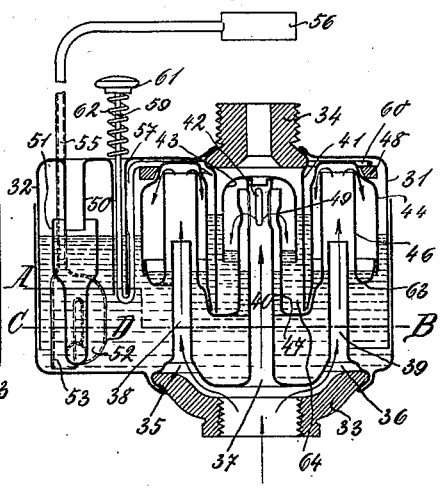
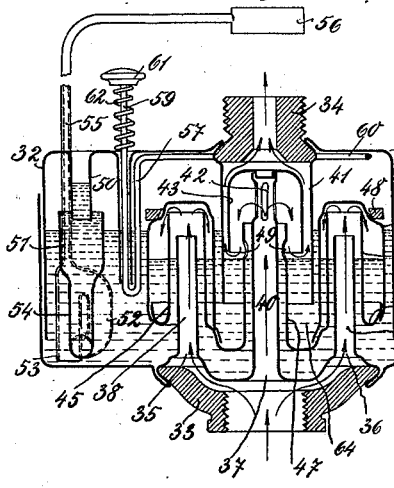
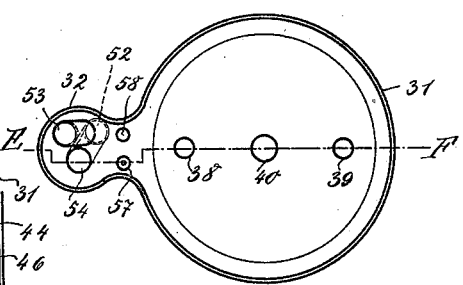
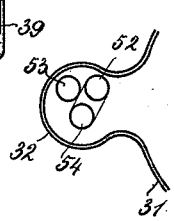
Witnesses.
Inventor:
Friedrich Huttenlocher.
by
Foster, Freeman, Watson & Coit,
Attorney.

UNITED STATES PATENT OFFICE.

FRIEDRICH HUTTENLOCHER, OF CHARLOTTENBURG, GERMANY.

SAFETY DEVICE FOR GAS-LAMPS.

1,043,938.  Specification of Letters Patent.  Patented Nov. 12, 1912.

Application filed August 17, 1911. Serial No. 644,659.

*To all whom it may concern:*

Be it known that I, FRIEDRICH HUTTENLOCHER, a subject of the King of Wurttemberg, and resident of 29 Gervinusstrasse, Charlottenburg, near Berlin, German Empire, have invented a new and useful Safety Device for Gas-Lamps, of which the following is a specification.

This invention relates to an improved device for use in conjunction with gas lamps and the like for the purpose of preventing the escape of unburnt gas on omission to ignite the gas or on the flame being extinguished without the gas cock being turned into its off position. Heretofore it has been usual for this purpose to employ thermostatic or spring devices actuating the gas cock or the like, but owing to the friction of the parts to be operated, such devices have usually proved inoperative inasmuch as they are often incapable of exerting sufficient force to overcome the friction of the parts. Thermostatic devices are moreover slow in operation so that additional mechanically operating means must be provided, thus increasing the friction of the parts to be operated.

According to the present invention I provide a combined thermostat and cut off device, the latter being made as far as possible frictionless in its movement. The device is inserted in the gas pipe and is so arranged that, on opening the gas cock, it is moved to cut off the gas supply. If the gas is not opportunely ignited or becomes extinguished, the cut-off device completes its movement and cuts off the gas supply, while on the other hand the ignition of the gas actuates the thermostat to prevent the cut-off device from completing its cut off movement. The arrangement is such that the thermostat is not required to accomplish any positive work. The movable member of the cut off device may either form the valve itself or it may actuate a mechanical valve or liquid seal. In the latter case the liquid seal may be formed integrally with the movable member.

My invention also comprises various other details of construction which will be hereinafter set forth.

Figure 1 is a view partly in section showing an incandescent gas lamp and one form of device for preventing the escape of gas therefrom, said device being inserted between the main gas cock and the burner gas cock. Fig. 2 is a sectional view of a modified form of the device shown in Fig. 1, the device being in this case inserted in the gas piping between the burner gas cock and the burner itself. Figs. 3-7 illustrate a modified form of the device illustrated in Fig. 2, Figs. 3-5 showing the device in vertical section on the line E—F of Fig. 6, and in the different positions assumed. Fig. 3 shows the device in the position of rest. Fig. 4 the position on igniting the gas and during the burning of the lamp, and Fig. 5 the cut-off position of the device, when the burner gas cock is opened. Fig. 6 is a transverse section on the line A—B of Fig. 5 and Fig. 7 is a partial section on the line C—D of Fig. 5. Fig. 8 is a vertical section showing a slight modification of the device illustrated in Figs. 3-7, the view showing the device in cut-off position.

Referring to Fig. 1 of the drawings 1 indicates the burner gas cock and 2 the gas service pipe. Fitted on the gas service pipe 2 is a tank 12 adapted to contain mercury or other suitable liquid and passing centrally through this tank is a pipe 3 connected at one end to the gas service pipe 2 and open at its upper end. Fitting on the upper open end of the pipe 3 is a perforated sleeve 13 which is carried centrally by a bell 4 dipping into the mercury in the liquid tank 12, the mercury thus forming a liquid seal. The top of the bell 4 is provided with a depression 11 or any other suitable means adapted, when the bell 4 is in its lowermost position, to close the open end of the pipe 3. Opening into the bell 4 is the gas pipe 5 leading to the burner gas cock 1 and to the burner. In proximity to the gas flame is provided a thermostat of any known type which is connected by means of a tube 7 with a chamber 8 provided with a diaphragm 9. The thermostat is preferably of the fluid or liquid type so that upon expansion of the fluid the diaphragm 9 moves outwardly. The diaphragm 9 carries a stop 10 which is adapted to engage a projection 6 on the bell 4.

The operation of the device hereinbefore described is as follows:—The drawing shows the position assumed by the several parts when the gas is ignited at the burner. As shown the burner gas cock 1 is opened and gas from the service pipe 2 is supplied to the burner through the pipe 5 as shown by the arrows. The pressure of the gas within the bell 4 maintains the bell somewhat lifted so that gas can issue from the open end of the tube 3, and the bell 4 is maintained in raised position by the stop 10 engaging the projection 6, the stop 10 being held in engaging position by the expansion of the fluid in the tube 7 acting on the diaphragm 9. If now it is assumed that the flame be extinguished by wind or the like, the fluid in the tube 7 will contract thus retracting the diaphragm 9 and stop 10 whereupon the bell 4 will gradually fall until the depression 11 closes the aperture in the end of the pipe 3. The bell 4 is so weighted as to fall by its own weight on the retraction of the stop 10. It will be seen that in this position the supply of gas to the burner will be cut off. In order to ignite the burner it is necessary to raise the bell 4 by hand or by convenient means, and if it is assumed that the gas cock 1 is now closed, gas will enter the interior of the bell 4 and raise the latter until the weight of the bell 4 equalizes the gas pressure. On thereupon opening the gas cock 1 the bell will gradually fall by its own weight owing to the fact that the opening of the gas cock 1 relieves the pressure of gas within the bell 4. If now the gas at the burner is not ignited within a predetermined period the bell 4 will have fallen to such an extent as to be beyond the stop 10 and will thereupon close the end of the pipe 3. If on the other hand, the gas issuing from the burner is ignited before the bell 4 has fallen any considerable amount, the expansion of the fluid in the pipe 7 will actuate the stop 10 which coacting with the projection 6 will prevent further downward movement of the bell 4 so that the parts will then be in the position illustrated at Fig. 1.

It will of course be readily understood that instead of the depression 11 for closing the open end of the pipe 3 any other suitable valve means may be employed, and if desired, a liquid seal valve may be employed.

In cases where the burner gas cock is considerably removed from the burner, as is for example often the case in inverted incandescent gas lamps the application of the device hereinbefore described might occasion difficulties and moreover detract from the appearance of the gas fitting. In this case the arrangement illustrated at Fig. 2 may be used, which may be inserted between the burner gas cock and the burner and it may be in proximity to the burner so that the necessity for long connections is obviated. In this arrangement the tank 15 containing the mercury or other liquid seal carries internally a support 14 to which is pivoted a double armed lever 16, one arm of which is pivotally connected to a rod 17 secured to the bell 4 dipping into the liquid. Gas is supplied to the interior of the bell 4 by way of a pipe 18 which leads from the burner gas cock while the gas is supplied directly to the burner without the intervention of a gas cock through the pipe 19, the inlet end of which is adapted to be closed by the end 11 of the double-armed lever 16. The movement of the bell 4 is also in this case adapted to be limited by means of a projection 10 on the diaphragm 9 of the thermostat 8. The operation in this case is as follows:—On opening the gas cock in the pipe 18, gas enters the interior of the bell 4 and raises the latter. Through the medium of the levers 17 and 16, the valve 11 approaches the open end of the pipe 19. If the gas issuing at the burner is ignited the diaphragm 9 and stop 10 will be actuated by the thermostat 8 so as to limit the upward movement of the bell 4 and thereby prevent the closing of the open end of the pipe 19 by the valve 11. If, however, the gas is not ignited or should the flame be extinguished, the stop 10 will be retracted and the bell 4 will thus continue its movement until the valve 11 tightly closes the open end of the pipe 19 and prevents further supply of the gas to the burner.

It will be readily seen that high pressures are quite unnecessary to set the apparatus in operation. Even where the gas is at a very low pressure, gas will collect in the bell 4 and gradually raise the latter so that the valve 11 will automatically prevent further supply of gas. This is furthermore possible inasmuch as owing to arranging the bell 4 in a liquid seal, the latter is as far as possible, frictionless in its movement, and thus admits of the proper operation of the valve 11.

In the modification shown in Figs. 3–7 31 is a substantially cylindrical tank or receptacle preferably made in two parts telescoped together, this cylindrical part 31 being in connection with a smaller lateral and substantially cylindrical tank 32. The tank 31 is provided with a connection 33 to which is screwed the piping leading from the burner gas cock and with a connection 34 to which is connected the burner itself, or a pipe leading directly to the burner. The interior of the tank 31 is in connection with the gas connection 33 through openings 35, 36 and 37, in a plate spaced some distance from the connection 33, this plate being preferably formed integral with tubes 38, 39 and 40. The central tube 40 extends somewhat higher in the tank 31 than the tubes 38 39 and extends into a downwardly projecting tube 41 connected to the outlet gas connection 34. The upper end of the tube 40 is provided with openings 42 and with a downwardly directed cap 43 fitting within the tube 41. An annular float or bell 44 preferably constructed in two parts, is fitted over the tubes 38, 39, 40 passing through concentric tubes 45, 46 and 47 carried by the member 44. The floating member 44 is preferably provided with a loading ring 48 and its central tube 47 is provided with openings 49 toward its upper end.

Depending into the tank and preferably into the side tank 32 is an open tube 50 opening into the widened upper end 51 of a tube 54 which is provided with upwardly and downwardly directed arms 52 and 53 in direct connection with the tube 54. The downwardly directed tubular arm 53 is open at its lower end and communicates at its upper end with a tube 55 terminating at its other end in a thermostatic device 56 which in this case is shown as a closed cylindrical chamber. The side tank 32 is also provided with two downwardly directed tubes 57 and 58, the tube 57 serving to guide a resetting device which comprises a rod 59 passing therethrough into the interior of the tank 31 and terminating above the floating member 44 in a ring 60. The outer end of the rod 59 is fitted with an operating knob 61 and is held in raised position under the action of the spring 62. The tube 58 serves for the introduction of the liquid.

The operation of the device is as follows:—In the position shown at Fig. 3 the device is in the position of rest and the liquid at same level throughout the apparatus. If gas is now admitted through the connection 33, the gas is distributed to the tubes 38, 39 and 40 as indicated by the arrows in Fig. 4. Gas therefore enters the interior of the float member 44, while a part of the gas passes through the openings 42 beneath the cap 43 and rises through the tube 41 and from thence to the connection 34. The gas entering the float member 44, depresses the level of the liquid therein and the liquid gradually escapes into the tank 31 through a small aperture 63 in the bottom of the float member 44. The member 44 at the same time gradually rises and would thereupon cut off the gas supply by the liquid in the annular space 64 between the float member 44 and its central tube 47 sealing the connection between the interior of the cap 42 and the tube 41, but this does not immediately take place owing to the fact that a part of the liquid in the space 64 can escape through the apertures 49 into the tube 47 and from there to the tanks 31. As the member 44 gradually rises, the air above the liquid in the tanks 31 and 32 escapes through the pipe 50 into the atmosphere. If now the gas issuing to the burner is opportunely ignited, the thermostatic device 56 will come into operation and the expansion of the fluid therein will cause the liquid in the tube 54 to rise in the enlarged upper part 51 until the outlet of air through the pipe 50 is cut off. Thereupon the air trapped in the tanks 31 and 32 prevents a further rise of the member 44 so that a constant supply of gas takes place from the gas connection 33 through the tube 40, openings 42, cap 43, tube 41 and the gas connection 34; this position of the parts is illustrated in Fig. 4. If however, the gas issuing from the burner is not ignited or should the lamp be unintentionally extinguished without the burner cock or the main gas cock being turned in its off-position, the thermostatic device 56 will not enter into operation, and air can therefore constantly escape through the pipe 50. The float member 44 will consequently rise to its highest position, whereupon the gas supply will be cut off by the cap 43 entering the liquid within the annular space 64. This position is shown in Fig. 5. The different heights of the liquid are occasioned by the different gas pressures existing within the tanks 31, 32.

The small aperture 63 in the bottom of the float member insures a steady and uniform movement of the float member 44, thus serving as a braking device entirely free of mechanisms.

If the device should attain the position indicated in Fig. 5, the float member 44 will not of itself return to its original position but it is necessary to provide some means for returning the member 44, such as shown on the drawings, viz. by depressing the knob 61 and consequently the ring 60. If desired of course this mechanical resetting mechanism may be replaced by any suitable type of automatic resetting mechanism, although it is believed to be preferable to employ a resetting device such as that illustrated on the drawings, which necessitates the presence of the attendant, thus calling his attention to the irregularity.

Fig. 8 illustrates a construction differing only from that shown in Figs. 3-7 in that the float member 44 is constructed as an annular inverted bell opening downward. In this case the liquid braking device is dispensed with and in lieu thereof the upper end of the air outlet tube 50 is constricted so as to leave a small outlet aperture 65 for throttling the escape of air.

I claim:—

1. A device for gas burners for preventing the escape of unburnt gas comprising an expansible chamber to which gas is supplied, a movable gas cut-off member independent of the burner gas cock and supported by said chamber and adapted, when the gas cock is opened, to move in one direction, under the influence of the flow of gas into said chamber, into its cut-off position, a thermostat actuated by the heat of the gas flame, and arresting means controlled by said thermostat for arresting the cutting-off movement of said member.

2. A device for gas burners for preventing the escape of unburnt gas comprising a liquid tank, a hollow member immersed in the liquid in said tank and forming an expansible chamber to which gas is supplied, said hollow member being adapted, when the burner gas cock is opened, to move in one direction under the influence of the flow of gas into said chamber, a gas cut-off member carried by said hollow member and adapted to be moved thereby to cut off the gas supply, a thermostat actuated by the heat of the gas flame, and arresting means controlled by said thermostat for arresting the movement of said hollow member and the consequent cutting-off movement of said gas cut-off device.

3. A device for gas burners for preventing the escape of unburnt gas comprising a liquid tank, a bell immersed in the liquid in said tank and forming an expansible chamber to which gas is supplied, said bell being adapted, when the burner gas cock is opened, to move in one direction under the influence of the flow of gas into said chamber, a gas cut-off member carried by said bell and adapted to be moved thereby to cut off the gas supply, a thermostat actuated by the heat of the gas flame, and arresting means controlled by said thermostat for arresting the movement of said bell and the consequent cutting-off movement of said gas cut-off device.

4. A device for gas burners for preventing the escape of unburnt gas comprising a liquid tank, an annular bell immersed in the liquid in said tank and forming an expansible chamber to which gas is supplied, said annular bell being adapted when the burner gas cock is opened, to move in one direction under the influence of the flow of gas into said chamber, a gas cut-off member carried by said annular bell and adapted to be moved thereby to cut off the gas supply, a thermostat actuated by the heat of the gas flame, arresting means controlled by said thermostat for arresting the movement of said annular bell and the consequent cutting-off movement of said gas cut-off device, and means for moving said annular bell in the opposite direction.

5. A device for gas burners for preventing the escape of unburnt gas, comprising in combination a liquid tank, inlet and outlet gas connections thereto, a liquid seal normally permitting the inlet and outlet of gas, a hollow member immersed in the liquid in said tank and forming an expansible chamber to which gas is supplied, said hollow member being adapted, when the burner gas cock is opened, to move upwardly under the influence of the flow of gas into said chamber, and to operate said liquid seal to cut off the gas supply, a thermostat actuated by the heat of the gas flame, arresting means controlled by said thermostat for arresting the movement of said hollow member and the consequent gas cut off by the liquid seal, and means for moving said hollow member in the downward direction.

6. A device for gas burners for preventing the escape of unburnt gas, comprising in combination a liquid tank, a central gas inlet pipe opening into said tank above the liquid therein, a gas outlet connection to said tank, a cap inverted over said gas inlet pipe, a liquid cup surrounding said inlet pipe and coöperating with said cap, a hollow member immersed in said tank and forming an expansible chamber, gas inlet connections to said expansible chamber, said hollow member carrying said liquid seal and being adapted to move upwardly under the influence of the flow of gas into said chamber so as to raise said liquid cup and immerse said cap in the liquid in said cup to cut off the gas supply, a thermostat actuated by the heat of the gas flame, arresting means controlled by said thermostat for arresting the upward movement of said hollow member and the consequent cut off of the gas supply, and means for moving said hollow member in the downward direction.

7. A device for gas burners for preventing the escape of unburnt gas comprising an expansible chamber to which gas is supplied, a movable gas cut-off member independent of the burner gas cock and supported by said chamber and adapted, when the gas cock is opened, to move in one direction under the influence of the flow of gas into said chamber, into its cut-off position, a fluid brake for braking the cutting-off movement of said member, a thermostat actuated by the heat of the gas flame, arresting means controlled by said thermostat for arresting the cutting-off movement of said member, and means for moving said member in the opposite direction.

8. A device for gas burners for preventing the escape of unburnt gas comprising an expansible chamber to which gas is supplied, a movable gas cut-off member independent of the burner gas cock and supported by said chamber and adapted, when the gas cock is opened, to move in one direction under the influence of the flow of gas into said chamber, into its cut-off position, an air brake for braking the cutting-off movement of said member, a thermostate actuated by the heat of the gas flame, arresting means controlled by said thermostat for arresting the cutting-off movement of said member, and means for moving said member in the opposite direction.

9. A device for gas burners for preventing the escape of unburnt gas comprising a closed liquid tank, inlet and outlet gas connections thereto, a hollow member immersed in the liquid in said tank and forming an expansible chamber to which gas is supplied, said hollow member being adapted when the burner gas cock is opened to move in one direction under the influence of the flow of gas to said chamber and compress the air inclosed in said tank, an air outlet pipe for the air in said tank, a gas cut-off member carried by said hollow member and adapted to be moved thereby to cut off the gas supply, a closed chamber adapted to be heated by the gas flame, piping from the said closed chamber, a looped pipe open to the liquid in said tank and connected to said piping, one arm of said looped pipe opening into said tank around said air outlet pipe and liquid in said looped pipe adapted to seal said air outlet pipe to arrest the movement of said hollow member and the consequent cutting off movement of said gas cut-off device, and means for moving said hollow member in the opposite direction.

In witness whereof I have hereunto set my hand in the presence of two witnesses.

FRIEDRICH HUTTENLOCHER.

Witnesses:
 WOLDEMAR HAUPT,
 HENRY HASPER.

Copies of this patent may be obtained for five cents each, by addressing the "Commissioner of Patents. Washington, D. C."